Patented Feb. 28, 1939

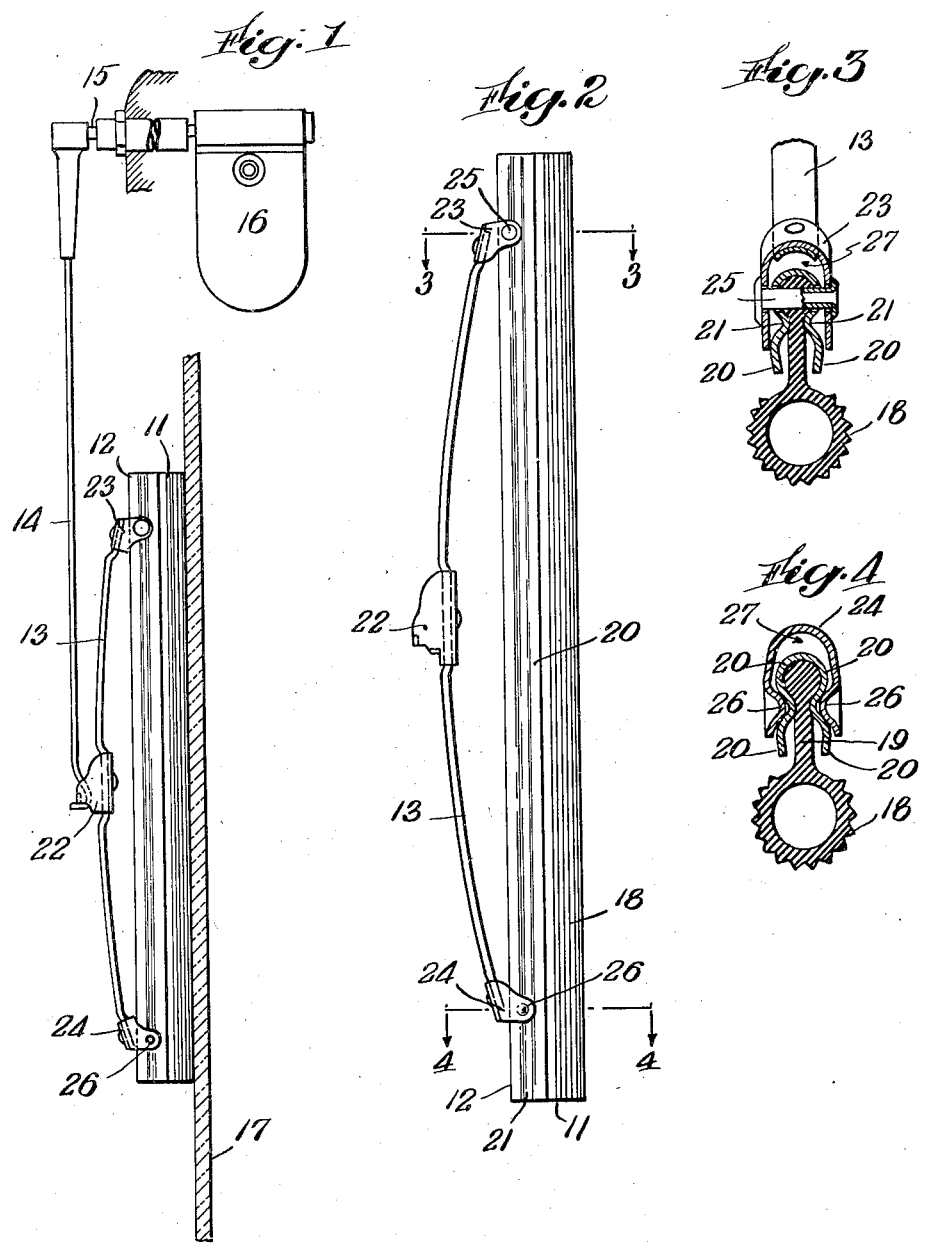

2,149,037

UNITED STATES PATENT OFFICE 2,149,037

WIPER FOR WINDSHIELDS

Max Zaiger, Swampscott, Mass.

Application February 9, 1938, Serial No. 189,597

2 Claims. (Cl. 15—250)

This invention relates to windshield wipers of the mechanically operated type used for cleaning rain or snow from the windshields of motor vehicles or the like, and pertains more particularly to improvements in the means for connecting the wiper arm to the wiper blade.

The present invention is an improvement on the type of attachment or connection described in Patent No. 1,510,509, dated October 7, 1924;
and the subject matter of this application is disclosed, in part, in my Patent No. 2,087,178, dated July 13, 1937.

The principal objects of this invention are to provide a simple and efficient windshield wiper which ensures close contact, under uniform pressure, between the wiper blade and the windshield throughout the length of the blade, under all conditions of use; which provides a flexible and resilient cushioning element adapted to compensate for varying degrees of pressure exerted upon the wiper element and for varying positions of the operating end of the wiper arm with respect to the wiper blade; and which admits of satisfactory motor operation of the wiper upon windshields of all types, regardless of the length of the wiper blade.

A recommended embodiment of the invention is shown in the accompanying drawing, in which:

Fig. 1 is a side view of a motor operated windshield wiper constructed in accordance with this invention;

Fig. 2 is a side view of the wiper blade and its associated elements, to larger scale; and Figs. 3 and 4 are transverse sections taken on lines 3—3 and 4—4, respectively, of Fig. 2.

In the particular embodiment chosen for the purpose of illustration, the wiper apparatus comprises a wiper element or blade 11 mounted in a channeled metal holder 12 which is connected by a bowed, resilient yoke member 13 to a wiper arm 14 fixed to a shaft 15 which is oscillated by a motor (driven electrically, pneumatically or mechanically from the electric or power systems of the automobile or other vehicle) conventional-ally indicated at 16. The type or structural features of the blade, arm, shaft and motor are not essential to the present invention, although it is contemplated that the arm 14 will be urged toward the windshield 17 by a spring or other resilient element (not shown) associated with the connection between the arm and the shaft 15, as is common practice.

As shown, the wiper blade consists of a strip of rubber having tubular wiping element 18, preferably formed with external, parallel ribs for efficiently wiping the windshield as the blade is swung back and forth, arcuately, over the pane; and a longitudinal tenon portion 19 embraced by the depending sides 20 of the metal holder 12 and gripped therebetween as illustrated in Fig. 3 or 4. In accordance with this invention, the sides 20 are formed with impressed longitudinal grooves 21 provided primarily as guides for a sliding attachment about to be described, but serving also to secure the blade tenon 19 in the holder.

The connection between the blade holder and the wiper arm 14, comprises the spring or yoke member 13 having any suitable form of clip 22, disposed between its ends, for detachably engaging the end of the arm (here shown as a hooked end, as an example of one of the several well known types of attachment); and U-shaped saddle elements 23 and 24 attached to or forming part of the respective ends of the yoke 13, and pivoted to the blade holder 12 near the opposite ends thereof. The saddle 23 is preferably fixed against longitudinal movement by a pin or rivet 25 as shown in Fig. 3; but the saddle 24 is formed with detents or keys 26, struck inwardly from its depending sides and fitting in the grooves 21 of the blade holder, so that said saddle may slide longitudinally of the blade holder but is prevented from movement transversely thereof.

The central portion of each saddle is supported above the top of the blade holder to provide an appreciable open space therebetween, as best shown at 27 (Figs. 3 and 4), so that the saddles may freely swing on their pivoted connections. This feature is important not only in order to afford easy sliding of the movable saddle 24, but also to allow for the full resilient effect of the spring yoke 13 and to avoid unusual stress which would be imposed upon the spring (at or near the respective saddles) and consequent weakness or breakage, which would result if the saddles tightly hugged the top of the blade holder and could not pivot freely.

It will be understood that the spring yoke 13 tends to flatten under the compressive action of the operating end of the wiper arm 14, thereby lengthening the yoke and moving the sliding saddle 24 outwardly; and that any inequalities in the pressure thus exerted will be absorbed and compensated by the spring, so that the pressure of the wiper blade 18 upon the windshield will be substantially uniform in degree. It is also apparent that such pressure is uniformly distributed along the entire length of the wiper blade by reason of the yoke-like character of the connection between the blade holder and the wiper arm.

It will be observed that the lower margins of the sides 20 of the blade holder are spaced from tenon 19 of the wiper blade (Figs. 3 and 4). This arrangement permits the blade 18 to roll or flap from side to side as is desirable, when the blade changes direction in its wiping motion over the windshield, without excessive strain upon the rubber itself.

A windshield wiper constructed as herein described may thus be used to clean large areas on windshields or the like, for the blade may be made as long as desired and will operate efficiently because of the compensated and uniform pressure applied through the spring yoke to the blade at points remote from its center; and such a device is peculiarly adapted for efficient operation by a motor drive of any of the types now used for automobile windshield wipers. Wiper blades and blade holders used in motor-operated wipers are invariably and desirably of light weight construction, and the clips which are connected to the wiper arm are usually attached to the blade by a rivet passing through the center of the blade holder. This conventional type of connection necessarily weakens the holder at the point where the force of the wiper arm is applied to the blade, and is therefore unsuitable for relatively long wiper blades which would be excessively strained at their point of greatest weakness and would tend to bend or break at the center even under normal operating conditions, unless reinforced.

The two-point support afforded by the spring yoke 13 avoids this center weakness, and ensures safe and efficient motor operation of a lightweight, unreinforced blade of a length sufficient to clean the large windshields of busses, trucks, street cars or like vehicles. It will be understood that the length of the yoke may be varied according to the length of the blade, and that the connections between the yoke and blade holder will be so located as to provide substantially uniform pressure along the entire length of the blade, as aforesaid.

I claim:

1. A windshield wiper comprising an elongated blade holder having substantially parallel sides formed with longitudinal grooves therein, a spring yoke having one end pivoted to the holder, a U-shaped member attached to the other end of the yoke and straddling the holder, said member having rounded projections received in said grooves whereby the member is movable angularly and longitudinally of the blade but is prevented from moving transversely thereof, and means connecting the yoke to a wiper arm.

2. A windshield wiper comprising an elongated blade holder having substantially parallel sides formed with longitudinal grooves therein, a spring yoke having saddles adjacent its opposite ends, one of the saddles having detents slidably and pivotally engaged in said grooves so that said saddle may move longitudinally and angularly of the holder but is prevented from moving transversely thereof, a fixed pivot connecting the other saddle to the holder, the central portion of each saddle being spaced appreciably from the adjacent surface of the holder so that each saddle may swing readily on its pivot, and means connecting the yoke to a wiper arm.

MAX ZAIGER.